H. M. BARBER.
METHOD OF FORMING STEREOTYPE PLATES.
APPLICATION FILED DEC. 9, 1910.
1,176,265.  Patented Mar. 21, 1916.
2 SHEETS—SHEET 2.
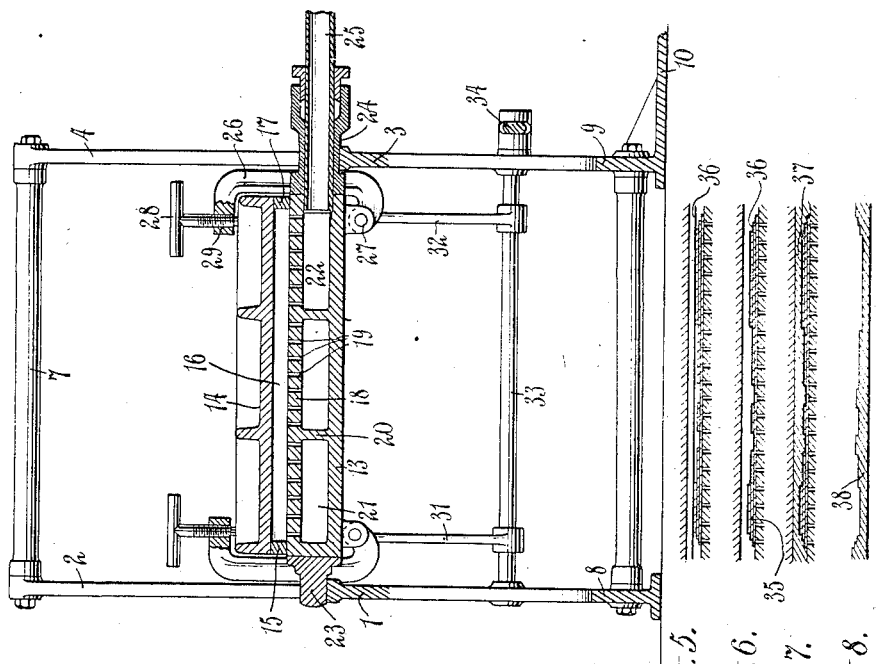
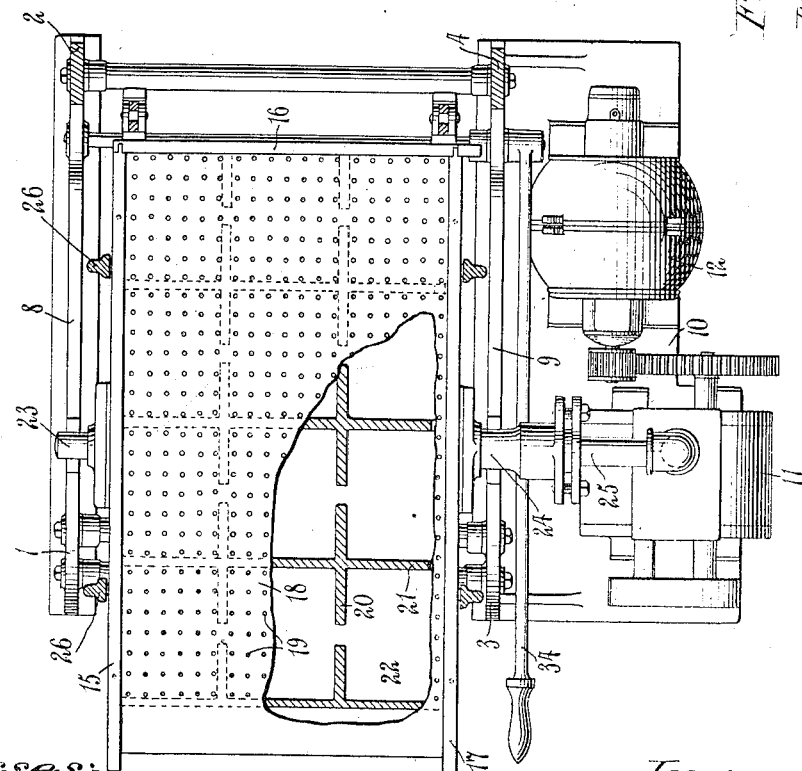

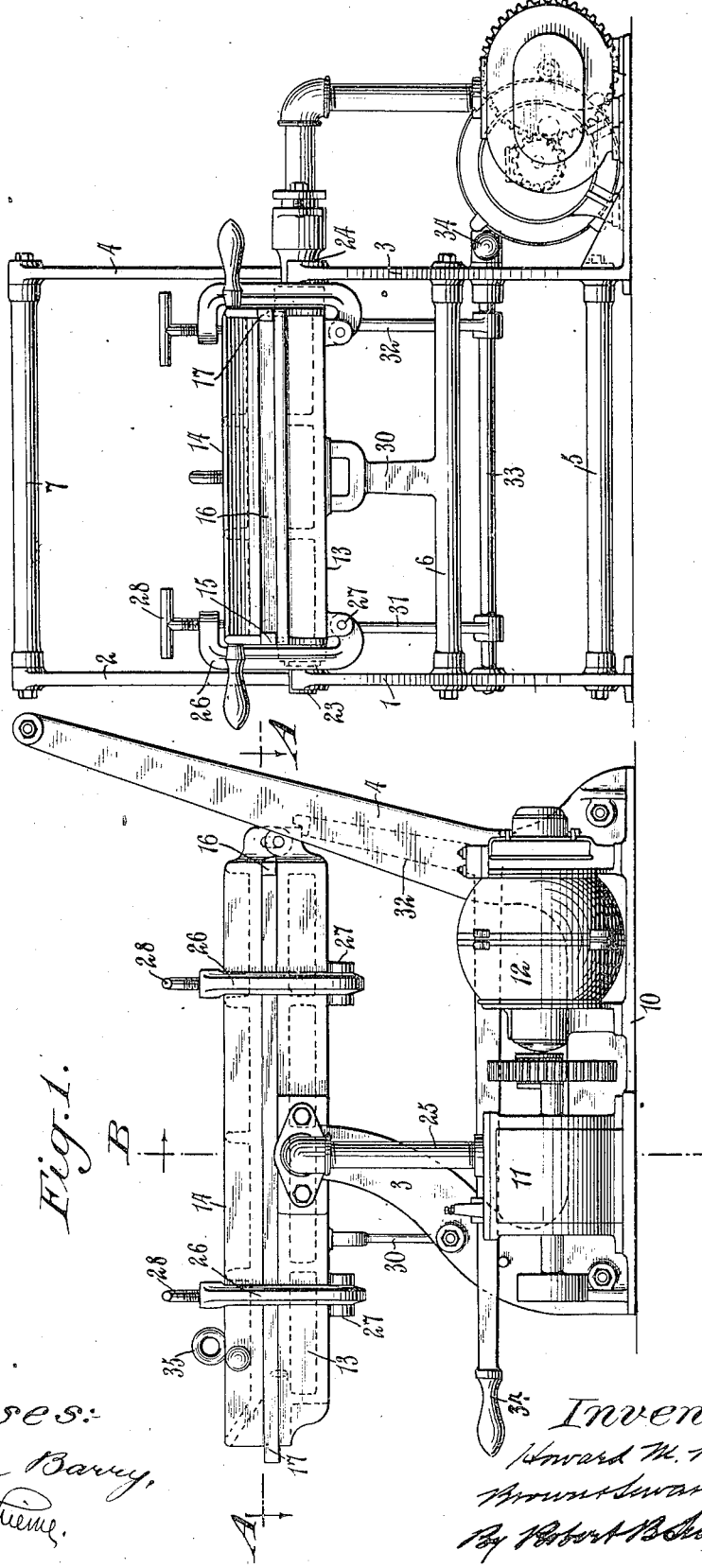

UNITED STATES PATENT OFFICE.

HOWARD M. BARBER, OF STONINGTON, CONNECTICUT, ASSIGNOR, BY MESNE ASSIGNMENTS, TO C. B. COTTRELL & SONS COMPANY, OF NEW YORK, N. Y., A CORPORATION OF DELAWARE.

METHOD OF FORMING STEREOTYPE-PLATES.

1,176,265. Specification of Letters Patent. Patented Mar. 21, 1916.

Application filed December 9, 1910. Serial No. 596,480.

*To all whom it may concern:*

Be it known that I, HOWARD M. BARBER, a citizen of the United States, and resident of Stonington, in the county of New London and State of Connecticut, have invented a new and useful Method of Forming Stereotype-Plates, of which the following is a specification.

The object of this invention is to provide a new method of forming a stereotype plate with gradations in its face to insure proper printing values therein, which method will produce a better plate than heretofore and in a more economical and expeditious manner.

In the method of forming stereotype plates heretofore it has been found extremely difficult, if not impossible, to hold the matrix by the use of mechanical devices, snugly against the surface upon which it rests, at all points throughout the matrix.

The particular object of this invention is to hold the matrix with its interposed reverse overlay in register on its back, snugly in position upon the surface which it engages, by means of suction, said suction also serving to draw the matrix down into the cut out places in the interposed reverse overlay.

The present invention is directed to the method of forming a stereotype plate with gradations in its face corresponding to the overlay used in connection with the matrix, which method is carried out as follows:—A reverse overlay is pasted onto the back of the matrix in proper register therewith. The matrix with its interposed overlay is placed upon a suction surface such, for instance, as the perforated inner wall of a vacuum pan forming part of a stereotype casting box. Means, such as an exhaust pump is used for exhausting the air from the vacuum pan and thus causing the matrix with its interposed reverse overlay to be drawn snugly against said perforated inner wall by suction exerted through the perforations in said inner wall, said suction as above set forth also serving to draw the matrix down into the depressions in the interposed reverse overlay. Molten stereotype metal is then poured into the casting box onto the face of the matrix while the matrix with its interposed overlay is held by suction against the surface upon which it rests.

If so desired, the overlay may be perforated so as to increase the suction effect upon that portion of the back of the matrix covered by the overlay so as to insure a more complete drawing of the matrix into the cut out places in the overlay during the formation of the plate.

A means for carrying out my invention is represented in the accompanying drawings, a description of which herewith follows:—

Figure 1 represents the casting machine in side elevation, Fig. 2 is a front view of the same, Fig. 3 is a horizontal section taken in the plane of the line A—A of Fig. 1, looking in the direction of the arrows, a portion of the perforated inner wall of the vacuum pan being broken away to illustrate more clearly the strengthening partitions which connect the inner and outer walls of the pan, Fig. 4 is a transverse vertical section taken in the plane of the line B—B of Fig. 1, looking in the direction of the arrows, and Figs. 5, 6, 7, 8, show the several steps in the process.

The frame of the casting machine is constructed as follows:—The front and rear uprights 1 and 2 at one side of the machine are connected to the front and rear uprights 3 and 4 at the other side of the machine by suitable cross bars 5, 6 and 7. The base for the uprights 1 and 2 is denoted by 8 and the base for the uprights 3 and 4 is denoted by 9, which latter base is extended laterally as shown at 10 to form a suitable support for an exhaust pump 11 and a motor 12 for driving the same. In the present instance, a rotary exhaust pump and an electric motor for driving it are shown.

The casting box of the machine comprises a hollow vacuum pan 13, a cover 14 and removable bars 15, 16, and 17, forming the three side walls of the casting chamber. The inner wall 18 of the vacuum pan is perforated as shown at 19. A plurality of longitudinal and transverse partitions 20, 21, connect the inner wall 18 with the outer wall 22 of the vacuum pan so as to prevent the pan from warping or becoming distorted. The partitions 20 and 21 are cut away as required to permit an open communication between all of the chambers formed by said partitions.

The casting box is pivoted to the front uprights 1 and 3 of the frame by providing the vacuum pan 13 with trunnions 23, 24, mounted in the upper ends of said uprights. The trunnion 24 is made hollow and communication from the interior of the hollow vacuum pan to the exhaust pump 11 is established through a pipe 25 extending through said hollow trunnion 24.

The pan 13, cover 14 and bars 15, 16, 17, are locked in their closed position by four screw clamps each comprising a yoke 26 hinged to lugs 27 on the vacuum pan 13 and having a clamp screw 28 passing through its overhanging arm 29 into engagement with the top of the cover 14.

When the casting box is in its horizontal position, its front portion rests upon a brace 30 uprising from the cross bar 6 and its rear portion rests upon the upper ends of two arms 31, 32, fixed to a rock shaft 33. A hand lever 34 is also fixed to this rock shaft 33 for swinging the arms 31, 32, out of their supporting engagement with the casting box to permit the box to be swung down into a substantially vertical position for carrying out the casting operation.

The cross bar 7 forms a support for the cover 14 when the cover is swung upwardly to open the casting box. The cover 14 may be provided with an eye 35 as a means of attachment to a hoisting device for swinging the cover into its raised position.

In operation, the casting box is brought into its horizontal position and the cover swung back into its open position. The reverse overlay 35 is pasted onto the back of the matrix 36 in proper register therewith and if desired the reverse overlay may be perforated for the purpose hereinbefore set forth. The matrix with its interposed reverse overlay is placed upon the perforated inner wall of the vacuum pan 13. The exhaust pump is then started and the matrix with its interposed overlay sucked down onto the face of the vacuum pan, the matrix at the same time being drawn down into the cut out portions of the overlay. The removable bars 15, 16 and 17 are then placed in position over the edges of the matrix and the cover is closed and clamped in the usual manner. The casting box is then swung into its substantially vertical position and the molten stereotype metal 37 is then poured into the casting box onto the face of the matrix while the matrix is still held by suction against the face of the vacuum pan, thus insuring the formation of a stereotype plate 38 of superior quality having the proper gradations in its printing face. The box is then returned to its horizontal position, the stereotype plate and matrix removed and the cycle of operations may then be repeated.

What I claim is:—

1. The method of forming a stereotype plate with gradations in its printing face consisting in casting the molten stereotype metal on a matrix held in position upon a suction surface with an interposed overlay.

2. The method of forming a stereotype plate with gradations in its printing face consisting in casting the molten stereotype metal on a matrix held in position upon a suction surface with an interposed reverse overlay.

3. The method of forming a stereotype plate with gradations in its printing face consisting in casting the molten stereotype metal onto the face of a matrix held in position upon a suction surface with an interposed overlay.

4. The method of forming a stereotype plate with gradations in its printing face consisting in casting the molten stereotype metal onto the face of a matrix held in position upon a suction surface with an interposed reverse overlay.

5. The method of forming a stereotype plate with gradations in its printing face consisting in placing a matrix upon a surface with an interposed overlay in register therewith, holding the matrix on said surface by suction and then casting the molten stereotype metal on the matrix.

6. The method of forming a stereotype plate with gradations in its printing face consisting in placing a matrix upon a surface with an interposed reverse overlay in register therewith, holding the matrix on said surface by suction and then casting the molten stereotype metal on the matrix.

7. The method of forming a stereotype plate with gradations in its printing face consisting in placing a matrix upon a surface with an interposed overlay in register on its back, holding the matrix on said surface by suction and then casting the molten stereotype metal onto the face of the matrix.

8. The method of forming a stereotype plate with gradations in its printing face consisting in placing a matrix upon a surface with an interposed reverse overlay in register on its back, holding the matrix on said surface by suction and then casting the molten stereotype metal onto the face of the matrix.

9. The method of forming a stereotype plate with gradations in its printing face consisting in placing a matrix upon a surface with an interposed overlay in register therewith, holding the matrix in position on said surface and drawing the matrix down into cut out places in the overlay, by suction, and then casting the molten stereotype metal on the matrix.

10. The method of forming a stereotype plate with gradations in its printing face consisting in placing a matrix upon a surface with an interposed reverse overlay in register therewith, holding the matrix in position on said surface and drawing the matrix down into the cut out places in the overlay, by suction, and then casting the molten stereotype metal on the matrix.

11. The method of forming a stereotype plate with gradations in its printing face consisting in placing a matrix upon a surface with an interposed reverse overlay in register on the back thereof, holding the matrix on said surface and drawing the matrix down into the cut out places in the overlay, by suction, and then casting the molten stereotype metal onto the face of the matrix.

12. The method of forming a stereotype plate with gradations in its printing face consisting in pasting a reverse overlay in register onto the back of a matrix, puncturing the overlay, placing the matrix with its interposed overlay upon a surface, holding the matrix on said surface by suction and casting the molten stereotype metal onto the face of the matrix.

In testimony, that I claim the foregoing as my invention, I have signed my name in presence of two witnesses, this fifth day of December, A. D. 1910.

HOWARD M. BARBER.

Witnesses:
   A. R. STILLMAN,
   KARL G. STILLMAN.